(12) United States Patent
Lisi et al.

(10) Patent No.: US 9,785,159 B2
(45) Date of Patent: Oct. 10, 2017

(54) CIRCUIT AND METHOD FOR EXTRACTING AMPLITUDE AND PHASE INFORMATION IN A RESONANT SYSTEM

(71) Applicant: Texas Instruments Incorporated, Dallas, TX (US)

(72) Inventors: Gianpaolo Lisi, Los Gatos, CA (US); Gerard Socci, Palo Alto, CA (US); Ali Djabbari, Saratoga, CA (US); Rajaram Subramonian, Cupertino, CA (US); Kosha Mahmodieh, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 705 days.

(21) Appl. No.: 14/247,617

(22) Filed: Apr. 8, 2014

(65) Prior Publication Data

US 2014/0319921 A1    Oct. 30, 2014

Related U.S. Application Data

(60) Provisional application No. 61/816,408, filed on Apr. 26, 2013.

(51) Int. Cl.
*H01F 27/42* (2006.01)
*H01F 37/00* (2006.01)
(Continued)

(52) U.S. Cl.
CPC .......... *G05F 1/12* (2013.01); *H02M 7/53803* (2013.01); *Y02B 70/1441* (2013.01)

(58) Field of Classification Search
CPC ... G05F 1/12; H02M 7/53803; Y02B 70/1441
(Continued)

(56) References Cited

U.S. PATENT DOCUMENTS

| 8,855,554 B2 * | 10/2014 | Cook | H02J 5/005 307/104 |
| 2013/0260676 A1 * | 10/2013 | Singh | H04B 5/0037 455/41.1 |

OTHER PUBLICATIONS

"Bandpass Signal Sampling and Coherent Detection", IEEE Transactions on Aerospace and Electronic Systems, vol. AES-18, No. 4, Nov. 1982, pp. 731-736.

(Continued)

*Primary Examiner* — Richard Tan
(74) *Attorney, Agent, or Firm* — Goutham Kondapalli; Charles A. Brill; Frank D. Cimino

(57) ABSTRACT

A resonant power transfer system includes resonant circuitry (26) including an inductor coil (59) and a resonant capacitor (51) coupled to a first terminal (27) of the inductor coil, wherein the inductor coil and the resonant capacitor resonate to produce an excitation signal ($I_S$) and a state variable signal ($V_{CS1}$). Sub-sampling circuitry (30) samples first and second points of the state variable signal at a rate which is substantially less than the RF frequency of the state variable signal. Information recovery circuitry (32) produces a state variable parameter signal representing a parameter (A) of the state variable signal from information in the first and second sampled points. Control circuitry (38) produces a first control signal in response to the state variable parameter signal. Detection and optimization circuitry (41) produces a second control signal in response to the state variable parameter signal. Voltage regulation circuitry (45) produces a regulated supply voltage in response to the first control signal. Switching inverter circuitry produces the excitation signal in response to the regulated supply voltage and the second control signal.

20 Claims, 5 Drawing Sheets

(51) Int. Cl.
*H01F 38/00* (2006.01)
*G05F 1/12* (2006.01)
*H02M 7/538* (2007.01)

(58) Field of Classification Search
USPC .......................................... 307/104; 455/41.1
See application file for complete search history.

(56) References Cited

OTHER PUBLICATIONS

"A VLSI Demodulator for Digital RF Network Applications: Theory and Results" by Gary J. Saulnier et al., IEEE Journal on Selected Areas in Communications, vol. 8, No. 8, Oct. 1990, pp. 1500-1511.

* cited by examiner

CIRCUIT AND METHOD FOR EXTRACTING AMPLITUDE AND PHASE INFORMATION IN A RESONANT SYSTEM

CROSS REFERENCE TO RELATED APPLICATION

This application claims the benefit of prior filed U.S. provisional application Ser. No. 61/816,408 filed Apr. 26, 2013, entitled "Method to Extract Amplifute [Amplitude] and Phase Information in a Resonant System to Optimize System Operation", by Gianpaolo Lisi, Gerard Socci, Ali Djabbari, Rajaram Subramonian, and Kosha Mahmodieh, and incorporated herein by reference.

BACKGROUND OF THE INVENTION

The present invention relates generally to optimizing operation of a resonant system for inductive power transfer between a transmitter and receiver system, or a "wireless power transfer system", and more particularly to optimizing parameters of "state variables" that affect an "operating point" of the resonant system. The invention also relates to performing the optimization in a way that results in the system being simpler, more flexible, and more cost-effective than is the case in prior systems.

A resonant inductive power transfer system includes an inductor and a capacitor that resonate at a fundamental frequency. It may be desirable to regulate the amount of current flowing through the inductor or the amount of voltage across the capacitor in order to regulate the intensity of the magnetic field generated by the inductor and thereby regulate the amount of power to be delivered to a load. The inductor current and the power delivered to the load is a function of the operating point of the resonant circuit. An operating point of the resonant system is a particular normal operating value of a particular state variable. In this example, the sinusoidal or quasi-sinusoidal inductor current and the sinusoidal or quasi-sinusoidal voltage across the resonant capacitor are state variables of the resonant system, and the amplitude and the phase of the inductor current and the amplitude and phase of the voltage across the resonant capacitor are parameters of those state variables. The amplitude and/or phase of a particular state variable may need to be determined or "extracted" in order to determine and/or regulate the state variable.

In a resonant system, several parameters may be optimized based on the resonant system operating point. The system operating point is determined by measurements of the phase and amplitude of one or more "state variables. Sampling the phase and amplitude of a state variable may require very fast analog to digital converters (ADCs), which usually are costly and consume a large amount of power.

Optimizing or regulating the amount of power that is being delivered from a transmitter to a receiver requires measuring parameters of one or more state variables that determine the transmitter-receiver system operating point. To achieve such measurements, known sub-sampling techniques (sometimes referred to as IF sampling, bandpass sampling, quadrature sampling, or simply sub-sampling) are utilized wherein a relatively high-frequency resonant signal is sampled at a much lower frequency, and then digital techniques are utilized to compute the amplitude and phase of the high-frequency resonant signal.

A reason for performing the optimization of a wireless power transfer system is that the system needs to be able to be optimized on a real-time basis, i.e., "on-the-fly", because the load on the transmitter changes frequently and sometimes drastically. For example, various remote receivers or other loads may frequently become connected and/or disconnected, and that causes the system operating point (or points) to vary considerably and therefore become non-optimal.

Prior Art FIG. 1A shows a sinusoidal waveform 1 which represents a high fundamental frequency (e.g., roughly 6 MHZ) of a state variable of a resonant system, such as the sinusoidal voltage across a resonant capacitor or the corresponding sinusoidal current through the resonant inductor. Sampling points P1 and P2 represent "low-frequency sample points" at which values of waveform 1 are sampled for the purpose of extracting the amplitude and/or phase of the state variable of interest. (Although FIG. 1A illustrates a sinusoidal waveform, it could be quasi-sinusoidal waveform in which a portion of each cycle is non-sinusoidal.)

Prior Art FIG. 1B shows a digital system/technique for computing the amplitude and/or phase of waveform 1 from the two sampled values P1 and P2 in FIG. 1A. Sample P1 is measured at a sample time k−1 and has the value $V_{CS1\_DSAMP(k-1)}$. Sample P2 is measured at sample time k and has the value $V_{CS1\_DSAMP(k)}$.

To generate or "extract" the amplitude information, the value $V_{CS1\_DSAMP(k-1)}$ of Sample P1 is squared, as indicated in block 5 of FIG. 1B, to produce the result $V_{CS1\_DSAMP(k-1)})^2$ on path 6, which is provided as an input to a digital summing function 7. Similarly, value $V_{CS1\_DSAMP(k)}$ of Sample P2 is squared, as indicated in block 13 of FIG. 1B to produce the result $V_{CS1\_DSAMP(k)})^2$ on path 14, which is provided as an input to digital summing function 7. Digital summing function 7 provides the value $(V_{CS1\_DSAMP(k-1)})^2 + (V_{CS1\_DSAMP(k)})^2$ on path 8, which is provided as an input to digital square root function 9. The result of the digital square root function 9 provides a representation of the amplitude of the signal represented by waveform 1 in FIG. 1A.

To generate or "extract" the phase information, both the value $V_{CS1\_DSAMP(k-1)}$ of Sample P1 and the value $V_{CS1\_DSAMP(k)}$ of Sample P2 are provided as inputs to circuitry in block 15 which performs an invert and sort function so as to generate a value/signal $V_{CS1\_I}$ on path 16, which is coupled to block 19, and also to generate a value/signal $V_{CS1\_Q}$ on path 17, which also is connected to block 19. In block 19, the arctangent function is performed on $V_{CS1\_I}$ and $V_{CS1\_Q}$ to generate the phase value/signal $$\tan^{-1}\left(\frac{V_{CS1\_Q}}{V_{CS1\_I}}\right)$$

on path 20.

Explained somewhat differently, the sampling provides values corresponding to the expressions $A*\sin(\omega t+\phi)$, $A*\cos(\omega t+\phi)$, $-A*\sin(\omega t+\phi)$, and $-A*\cos(\omega t+\phi)$ at successive discrete times k−1 and k, k+1, k+2 and k+3. The squaring function generates the quantity $A^2 \cos^2(\omega t+\phi) + A^2 \sin(\omega t+\phi)$, which corresponds to $A^2$. Those two values are summed, which provides a value that represents $A^2$. Then the square root of that value is computed to determine a value that represents the amplitude A of the selected state variable.

More specifically, a sinusoidal waveform $V_{CS1}(t) = A(t)*\sin(2\pi fo*t+\theta(t))$ is sampled at discrete times $t=k*n/(4*fo)$, where n is an odd integer and an asterisk (*)

represents multiplication. These samples are referred to as $V_{CS1\_DSAMP(k)}$. Sampling at these specific times provides the following.

For k=0, 4, 8, ... and n odd=1, 5, 9 ... :

$$V_{CS1\_DSAMP(k)} = A(k)*\sin\theta(k))$$

$$V_{CS1\_DSAMP(k+1)} = A(k+1)*\cos(\theta(k+1))$$

$$V_{CS1\_DSAMP(k+2)} = -A(k+2)*\sin(\theta(k+2))$$

$$V_{CS1\_DSAMP(k+3)} = -A(k+3)*\cos(\theta(k+3))$$

Alternately, for k=0, 4, 8, ... and n odd=3, 7, 11 ... :

$$V_{CS1\_DSAMP(k)} = A(k)*\sin(\theta(k))$$

$$V_{CS1\_DSAMP(k+1)} = -A(k+1)*\cos(\theta(k+1))$$

$$V_{CS1\_DSAMP(k+2)} = -A(k+2)*\sin(\theta(k+2))$$

$$V_{CS1\_DSAMP(k+3)} = A(k+3)*\cos(\theta(k+3))$$

Samples can be processed to remove the inversion and sorted into quadrature and in-phase pairs, as follows:

$$V_{CS1\_Q(m)} = A(m)*\sin(\theta(m))$$

$$V_{CS1\_I(m+1)} = A(m+1)*\cos(\theta(m+1))$$

If the change in amplitude and phase for successive pairs of samples is small, i.e. A(m+1)~A(m) and θ(m+1)~θ(m), then the amplitude and phase can be recovered by processing sample pairs. For example using the assumption A(m+1)~A(m) and θ(m+1)~θ(m), then:

$$A(m+1) = \text{sqrt}(V^2_{CS1\_Q(m)} + V^2_{CS1\_I(m+1)})$$

where sqrt is the square root function.

$$\theta(m+1) = \arctan(V_{CS1\_Q(m)}/V_{CS1\_I(m+1)})$$

where arctan is the arctangent function.

One Prior Art reference which describes this technique is "Bandpass Signal Sampling and Coherent Detection" by W. M. Waters and B. R. Jarrett, in IEEE Transactions on Aerospace and Electronic Systems, Volume AES-18, Issue 6, 1982. This reference discloses that conversion of signals from IF (intermediate frequency) analog form into digital complex samples carrying phase and amplitude information has been implemented in the form of two parallel IF baseband converters operated in quadrature each followed by A/D converters to provide digitized in-phase "I" and quadrature "Q" components based on samples taken from the relatively low-frequency IF signal rather than the relatively high-frequency fundamental signal. The section entitled "Calculation of I and Q from IF Samples" on page 731 is especially relevant. Another relevant Prior Art reference is the article "A VLSI Demodulator for Digital RF Network Applications: Theory and Results" by Gary J. Saulnier, IEEE Journal on selected areas in communications, Volume 8, Number 8, October 1990. See the section "Subharmonic Sampling" on page 1503.

FIG. 2 is a block diagram of a generalized prior art wireless power transfer system. Block 200 includes a wireless power transfer system with a coupled inductor structure. The inductors and capacitors shown are parameters of a circuit model which includes 2 coils or inductors $L_{K1}$ and $L_{K2}$ and matching capacitors C1s and C2s. A signal source 30 and load 340,350 are also shown.

For the frequency ω=2πf, the capacitance of capacitor C1s is equal in magnitude to the inductance of model 200 inductor $L_{K1}$, the capacitance of capacitor CM is equal in magnitude to the inductance of inductor $L_M$, and the capacitance of capacitor C2s is equal in magnitude to the inductance of inductor $L_{K2}$. Thus, at the frequency ω=2πf, the imaginary part of the reactance of each capacitor cancels out the imaginary part of the reactance of its corresponding inductor, and the circuit of FIG. 2 is impedance-matched for the frequency ω=2πf. In the ideal case the system appears to the power supply as a purely resistive load, allowing for improved power transfer. Impedance matching may be done at the design stage for a known operating frequency, or during operation for changing system conditions. For example, at least one of capacitors CM, C1s, and C2s may be implemented as variable capacitors to allow for tuning of the impedance matching during operation for changing system conditions. Variable capacitors, or other variable components, also allow for adjusting the resonant frequency of an associated resonant circuit.

It is well-known that if the transmitter coil/inductor is operating at resonance with a resonant capacitor in a resonant system, and if another coil in a receiver is located sufficiently close to the transmitter, that other "receiver" coil (which is connected to a capacitor such that the coil/inductor and capacitor have the same (or similar) resonance frequency as the transmitter circuit) will resonate with the magnetic field being generated by the transmitter coil. The receiver coil absorbs some of the transmitted energy if a load is connected to it, and this changes the operating point of the system including the transmitter and receiver, and therefore also changes the amplitude and phase of the one or more state variables of the system.

Thus, there is an unmet need for an improved way to optimize parameters of "state variables" that affect an operating point of a resonant system.

There also is an unmet need for an improved way to optimize operation of a resonant system in an inductive wireless power transmitter-receiver system in a way that provides a simpler, more flexible, and more cost-effective inductive wireless power transmitter-receiver system than is available in the prior art.

There also is an unmet need for an improved way to optimize operation of a resonant wireless system for transferring power.

SUMMARY OF THE INVENTION

It is an object of the invention to provide an improved way of optimizing parameters of "state variables" that affect an operating point of a resonant system.

It is another object of the invention to provide an improved way of optimizing operation of a resonant system in an inductive wireless power transmitter-receiver system in a way that provides a simpler, more flexible, and more cost-effective inductive wireless power transmitter-receiver system than is available in the prior art.

It is another object of the invention to provide an improved way of optimizing operation of a resonant wireless system for transferring power.

Briefly described, and in accordance with one embodiment, the present invention provides a resonant power transfer system that includes resonant circuitry (26) including an inductor coil (59) and a resonant capacitor (51) coupled to a first terminal (27) of the inductor coil, wherein the inductor coil and the resonant capacitor resonate to produce an excitation signal ($I_S$) and a state variable signal ($V_{CS1}$). Sub-sampling circuitry (30) samples first and second points of the state variable signal at a rate which is substantially less than the RF frequency of the state variable signal. Information recovery circuitry (32) produces a state variable parameter signal representing a parameter (A) of the state variable signal from information in the first and second sampled points. Control circuitry (38) produces a first control signal in response to the state variable parameter signal. Detection and optimization circuitry (41) produces a second control signal in response to the state variable parameter signal. Voltage regulation circuitry (45) produces a regulated supply voltage in response to the first control signal. Switching inverter circuitry produces the excitation signal in response to the regulated supply voltage and the second control signal.

In one embodiment, the invention provides a resonant power transfer system (25) including resonant circuitry (26) including an inductor coil (59) and a resonant capacitor (51 or 52 in FIG. 4A) coupled to a first terminal (27) of the inductor coil (59), wherein the inductor coil (59) and the resonant capacitor (51 or 52) resonate to produce an excitation signal (49,$I_S$) and a state variable signal (e.g., $V_{CS1}$ or $I_S$). Sub-sampling circuitry (30) samples first (P1) and second (P2) points of the state variable signal (e.g., $V_{CS1}$ or $I_S$) at a rate which is substantially less than the RF frequency of the state variable signal (e.g., $V_{CS1}$ or $I_S$). Information recovery circuitry (32) produces a state variable parameter signal (33,A) representing a parameter (A) of the state variable signal (e.g., $V_{CS1}$ or $I_S$) from information (33) in the first (P1) and second (P2) sampled points. Control circuitry (38) produces a first control signal (40) in response to the state variable parameter signal (33,A). Detection and optimization circuitry (41) produces a second control signal (39) in response to the state variable parameter signal (31,A). Voltage regulation circuitry (45) produces a regulated supply voltage (47) in response to the first control signal (40). Switching inverter circuitry (48) produces the excitation signal (49,$I_S$) in response to the regulated supply voltage (47) and the second control signal (39).

In a described embodiment, the resonant circuitry (26) is part of a transmitter circuit for wirelessly transmitting power to a receiving circuit (42), wherein the state variable parameter signal represents an amplitude (A) of the state variable, and wherein the information recovery circuitry (32) also produces a state variable phase signal (34,θ) representing a state variable phase (θ), and wherein the detection and optimization circuitry (41) produces the second control signal (39) in response to both the state variable amplitude signal (33,A) and the state variable phase signal (34,θ). In one embodiment, the switching inverter circuitry (48) includes first (QH) and second (QH) switches alternately coupling a second terminal of the inductor coil (59) to the regulated supply voltage (47) and a first reference voltage (GND), wherein the detection and optimization circuitry (41) controls an amount of dead-time during which the first (QH) and second (QH) switches off.

In one embodiment, the state variable signal (e.g., $V_{CS1}$ or $I_S$) is equal to a voltage ($V_{CS1}$) developed across the resonant capacitor (51). In one embodiment, the excitation signal (49,$I_S$) is equal to a current ($I_S$) in the inductor coil (59). In one embodiment, the information recovery circuitry (32) produces the state variable amplitude signal (31,A) by squaring and then summing the values ($V_{CS1\_DSAMP(k-1)}$ and $V_{CS1\_DSAMP(k)}$ in FIG. 1B) of the sampled first (P1) and second (P2) points, and then computes the square root of the squared and then summed values.

In a described embodiment, the information recovery circuitry (32) produces the state variable phase signal (34,θ) by inverting and sorting the appropriate values ($V_{CS1\_DSAMP(k-1)}$ to obtain a first value ($V_{CS1\_I}$) and a second value ($V_{CS1\_Q}$), and computing the arctangent of the quotient obtained by dividing the second value ($V_{CS1\_Q}$) by the first value ($V_{CS1\_I}$).

In one embodiment, the resonant power transfer system includes circuitry (35) for comparing the amplitude (A) of the state variable (e.g., $V_{CS1}$ or $I_S$) to a first reference value (36) to produce a first error signal (37) as an input to the control circuitry (38). The sub-sampling circuitry (30) includes a relatively slow ADC (analog to digital converter) (67 in FIG. 3B) having an output (68 in FIG. 3B) coupled to a digital input of the information recovery circuitry (32). The information recovery circuitry (32) has a digital output (33,A) coupled to a first input of a digital summing and comparing circuit (35) for comparing the output (33,A) of the information recovery circuitry (32) with a reference value (36) to generate a first error signal (37 in FIG. 3A, 80 in FIG. 3B) as an input to the control circuitry (38), wherein the information recovery circuitry (32), detection and optimization circuitry (41), and control circuitry (38) are digital circuits.

In one embodiment, the sub-sampling circuitry (30), information recovery circuitry (32), detection and optimization circuitry (41), and control circuitry (38) are analog circuits.

In a described embodiment, the detection and optimization circuitry (41) controls the amount of dead-time so as to accomplish zero-voltage-switching (ZVS) of the first (QH) and second (QL) switches so as to reduce power consumption in the first (QH) and second (QL) switches and reduce electromagnetic interference (EMI).

In one embodiment, a receiver coil (42) receives and loads the transmitter circuitry (26) in a way that provides information about the receiver coil to the transmitter by shifting the first (P1) and second (P2) sampled points.

In one embodiment, the switching inverter circuitry (48) includes a first transistor (QH) coupled between a second terminal (49) of the inductor coil (59) and the regulated supply voltage (47), and also includes a second transistor (QL) coupled between the second terminal (49) of the inductor coil (59) and a reference voltage (GND). The resonant capacitor is coupled between the regulated supply voltage (47) and the first terminal (27) of the inductor coil (59), and the first transistor (QH) and second transistor (QL) are controlled in response to information contained in the state variable signal (e.g., $V_{CS1}$ or $I_S$). An additional resonant capacitor (52 or 51 in FIG. 4A) is coupled between the first terminal (27) of the inductor coil (59) and the reference voltage (GND).

In one embodiment, the invention provides a method for operating a resonant power transfer system (25), including providing resonant circuitry (26) including an inductor coil (59) and a resonant capacitor (51,52) coupled to a first terminal of the inductor coil (59); operating the inductor coil (59) and the resonant capacitor (51,52) to cause them to resonate in response to an excitation signal (49,$I_S$) to produce a state variable signal (e.g., $V_{CS1}$ or $I_S$) having an RF frequency; sub-sampling first (P1) and second (P2) points of the state variable signal (e.g., $V_{CS1}$ or $I_S$) at a rate which is substantially less than the RF frequency; recovering information in the first (P1) and second (P2) sampled points to produce a state variable amplitude signal (33,A) representing a parameter (A) of the state variable signal (e.g., $V_{CS1}$ or $I_S$); producing a first control signal (40) in response to the state variable parameter signal (33,A); producing a second control signal (39) in response to the state variable parameter signal (31,A); producing a regulated supply voltage (47) in response to the first (40) control signal; and operating switching inverter circuitry (48) to produce the excitation signal (49,$I_S$) in response to the regulated supply voltage (47) and the second control signal (39).

In one embodiment, the parameter is an amplitude of the state variable signal, and the method includes operating the information recovery circuitry (32) to produce a state variable phase signal (34,θ) representing a state variable phase (θ), and operating the detection and optimization circuitry (41) to produce the second control signal (39) in response to both the state variable amplitude signal (33,A) and the state variable phase signal (34,θ).

In one embodiment, wherein the switching inverter circuitry (48) includes first (QH) and second (QL) switches, the method includes alternately coupling a second terminal of the inductor coil (59) to the regulated supply voltage (47) and a first reference voltage (GND), and operating the detection and optimization circuitry (41) to control an amount of dead-time during which the first (QH) and second (QH) switches are off at the same time.

In one embodiment, wherein the sub-sampling circuitry (30) includes a relatively slow ADC (analog to digital converter) (67 in FIG. 3B) having an output (68 in FIG. 3B) coupled to a digital input of the information recovery circuitry (32), the information recovery circuitry (32) having a digital output (33,A) coupled to a first input of a digital summing and comparing circuit (35), the method includes comparing the output (33,A) of the information recovery circuitry (32) with a reference value (36) to generate a first error signal (37 in FIG. 3A, 80 in FIG. 3B) as an input to the control circuitry (38), wherein the information recovery circuitry (32), detection and optimization circuitry (41), and control circuitry (38) are digital circuits.

In one embodiment, the method includes operating the detection and optimization circuitry (41) to control the amount of dead-time so as to accomplish zero-voltage-switching (ZVS) of the first (QH) and second (QL) switches so as to reduce power consumption in the first (QH) and second (QL) switches and so as to reduce electromagnetic interference (EMI).

In one embodiment, the invention provides a resonant power transfer system (25), including transmitter circuitry (26) including an inductor coil (59) and a resonant capacitor (51,52) coupled to a first terminal of the inductor coil (59), and means (48,49) for operating the inductor coil (59) and the resonant capacitor (51,52) to cause them to resonate in response to an excitation signal (49,$I_S$) to produce a state variable signal (e.g., $V_{CS1}$ or $I_S$) having an RF frequency; means (30) for sub-sampling first (P1) and second (P2) points of the state variable signal (e.g., $V_{CS1}$ or $I_S$) at a rate which is substantially less than the RF frequency of the state variable signal (e.g., $V_{CS1}$ or $I_S$); means (32) for recovering information in the first (P1) and second (P2) sampled points to produce a state variable amplitude signal (33,A) representing a parameter (A or θ) of the state variable signal (e.g., $V_{CS1}$ or $I_S$); means (35) for comparing the amplitude (A) of the state variable (e.g., $V_{CS1}$ or $I_S$) to a first reference value (36) to produce a first error signal (37) in response to the state variable parameter signal (33,A); means (38) for producing a first control signal (40) in response to the first error signal (37); means (41) for producing a second control signal (39) in response to the state variable parameter signal (31,A); means (45) for producing a regulated supply voltage (47) in response to the first (40) control signal; and means (48) for operating switching inverter circuitry (48) to produce the excitation signal (49,$I_S$) in response to the regulated supply voltage (47) and the second control signal (39).

DETAILED DESCRIPTION OF THE PREFERRED EMBODIMENTS

Difficulties encountered due to the presence of parasitic circuit elements at high frequencies (e.g., roughly 6 MHZ) can result in reduced performance of conventional sensing circuits in wireless power transfer systems because of the effects of such parasitics on measurement of the system operating points. An alternate sensing method has been found for measuring the system operating point for achieving the objective of providing a relatively simple, flexible, and cost-effective design of an inductive power transfer system.

To overcome the previously mentioned difficulties, a wireless power transfer system is disclosed wherein a power transmitter excites a transmitter coil at a high frequency. It may be desirable/necessary to detect both the amplitude and phase of the current in the transmitter inductor coil in order to determine the operating point of the system. In accordance with the present invention, known sub-sampling techniques are utilized to extract such amplitude information, and/or also phase information if desired, while using a slow but cost-effective and power-efficient ADC (analog to digital converter) so that the ADC speed can be a function of the rate at which the amplitude and phase information changes in the system, rather than being determined only by the system operating frequency.

Since the signal transmitted by the transmitter is a narrow band signal, it is not necessary to sample a selected state variable at the same frequency (or higher) as the transmitted signal. The required sample rate of the state variable is determined by the rate of change of the amplitude and phase of the state variable, which is represented by its bandwidth. Since the amplitude and phase of the state variable changes at a relatively low rate compared to the transmitter fundamental frequency, the high frequency signal can be sampled at a much lower frequency than the fundamental frequency in order to perform the desired control/regulation function of the transmitter.

In a described wireless power transfer system, a transmitter excites an inductor coil at a high frequency (e.g., roughly 6 MHZ), and it is necessary to determine the amplitude and phase of the transmitter coil current to determine and regulate (or otherwise control) the operating point of the wireless power transfer system. Since the transmitter coil excitation signal usually is at a known fundamental frequency signal, the sub-sampling techniques may be used to sample the fundamental-frequency signal of a state variable at a frequency that is much lower than the fundamental frequency.

Figure 3A:
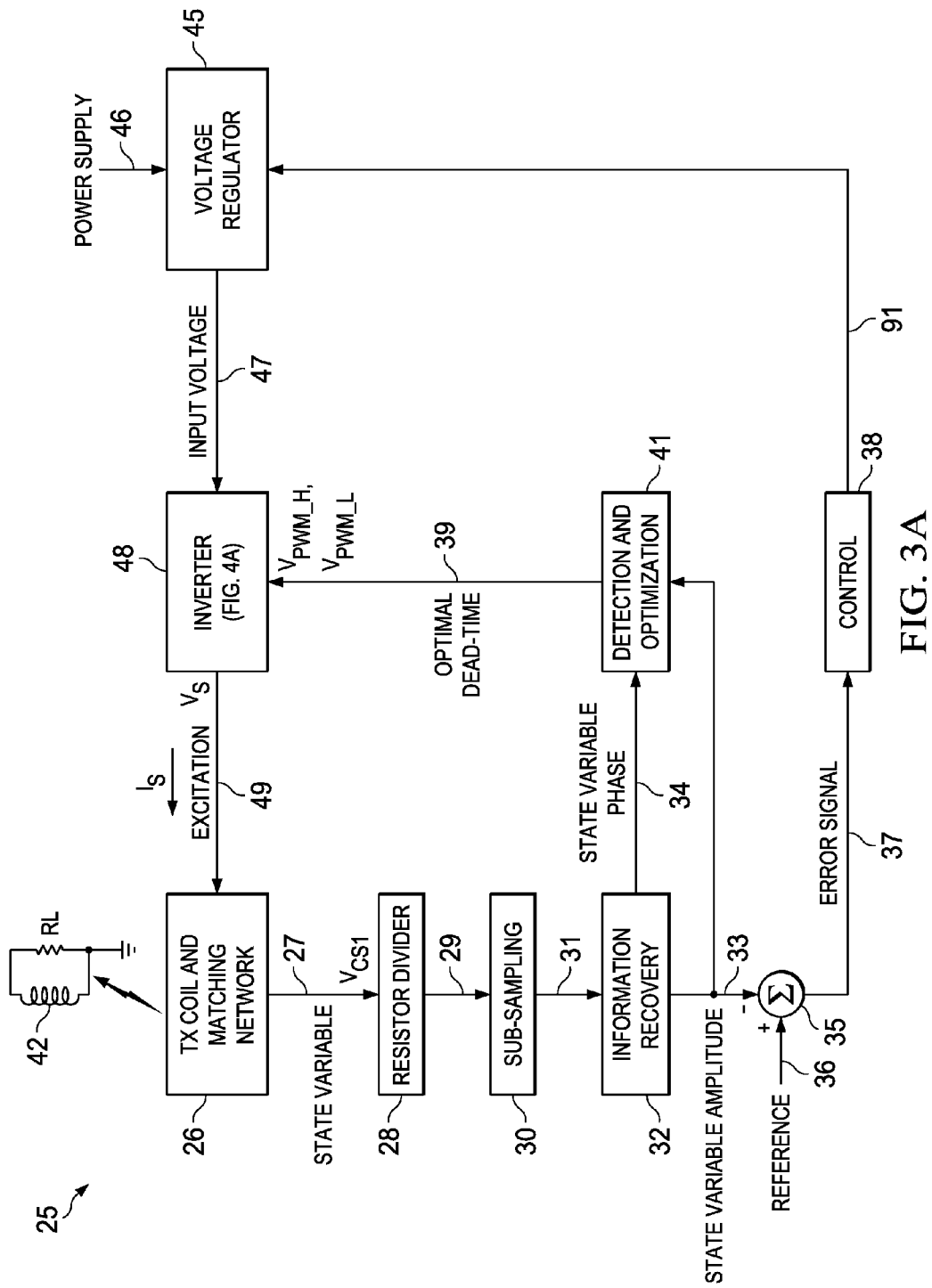
FIG. 3A is a block diagram of a transmitter circuit that can be used in a wireless power transfer system in accordance with the present invention.

Referring to FIG. 3A, which is a block diagram of a transmitter circuit that can be used to control a wireless power transfer system in accordance with the present invention, the state variable chosen for the transmitter coil and matching network circuit 26 is the voltage $V_{CS1}$ on conductor 27. Conductor 27 can be the junction between two resonant capacitors 51 and 52 of capacitance $C_{S1}$ shown in FIG. 4A, described below.

Figure 4A:
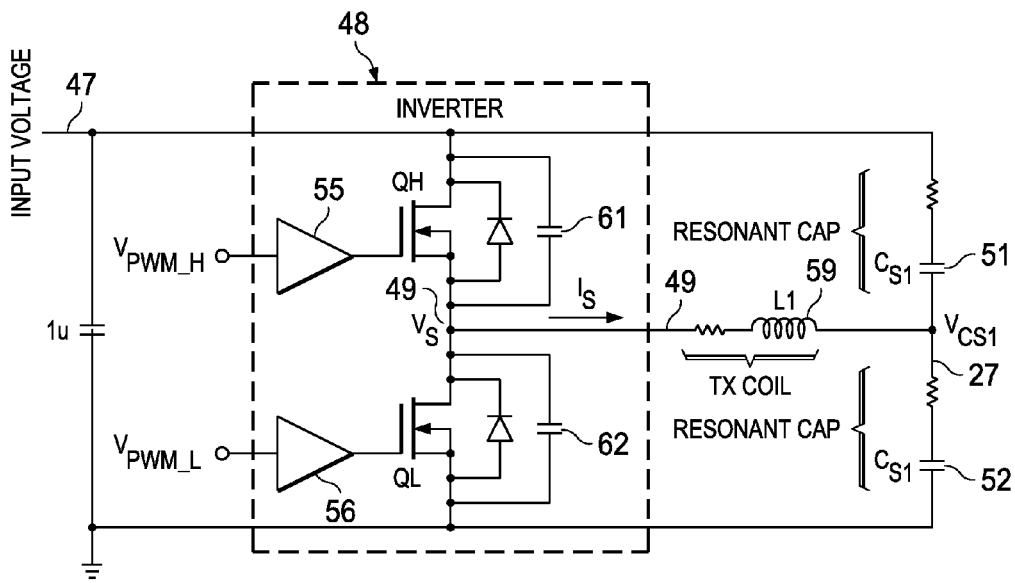
FIG. 4A is a schematic diagram of inverter circuitry which can be used in block 48 of FIG. 3.

FIG. 4A is a schematic diagram that shows transmitter inductor coil 59, two resonant capacitors 51 and 52, and inverter 48 of FIG. 3A. One terminal of transmitter coil 59 is connected to conductor 27, and its other terminal is connected to conductor 49 as shown in both FIGS. 3A and 4. Resonant capacitor 51 is connected between conductor 27 and the output 47 of voltage regulator 45. Resonant capacitor 52 is connected between conductor 27 and ground. In FIG. 4A, an N-channel MOS transistor QH is coupled between the output 47 of voltage regulator 45 in FIG. 3A and conductor 49, on which the voltage $V_S$ is generated. The gate of transistor QH is driven by a PWM (pulse width modulated) signal $V_{PWM\_H}$. Similarly, an N-channel MOS transistor QL is coupled between conductor 49 and ground. The gate of transistor QL is driven by a pulse width modulated signal $V_{PWM\_L}$. Capacitors 61 and 62 in FIG. 4A are coupled between the drains and sources of transistors QH and QL, respectively, and include parasitic capacitances of transistors QH and QL.

Figure 1A:
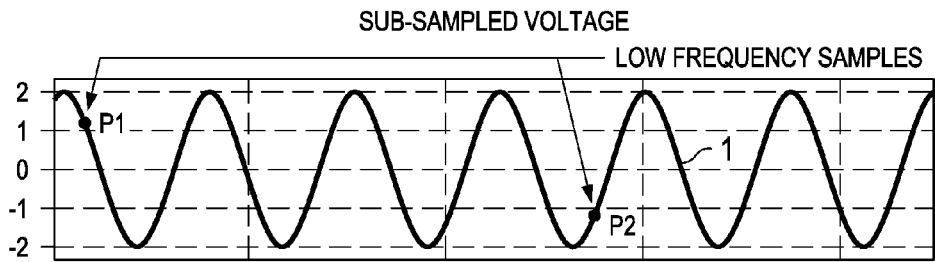
FIG. 1A is a sinusoidal waveform of a high fundamental-frequency signal indicating conventional low-frequency sub-sampling thereof to extract amplitude and phase information.

Referring again to FIG. 3A, the signal transmitted wirelessly (as indicated by reference numeral 43) by the transmitter coil 59 (FIG. 4A) in block 26 may be received by a receiver coil 42. A load $R_L$ is coupled between the terminals of receive coil 42, one terminal being connected to ground. The voltage $V_{CS1}$ on resonant junction conductor 27 is divided by resistive divider circuit 28 in FIG. 3A to scale it down to a suitable value on conductor 29. That value then is sub-sampled at a frequency that is much lower than the fundamental resonant frequency of waveform 1 in FIG. 1A by means of sub-sampling circuit 30. In a digital implementation, sub-sampling may be accomplished by means of a relatively slow, low cost, power-efficient ADC (analog to digital converter), and the digital result on bus 31 is input to information recovery circuit 32. Information recovery circuit 32 performs the function of extracting information that represents the amplitude A and the phase θ of the fundamental-frequency state variable waveform 1 shown in FIG. 1A. The extracted amplitude information A is conducted on bus 33 to an input of a digital summation circuit 35 and to one input of a detection and optimization circuit 41. The extracted phase information θ is conducted on bus 34 to another input of detection and optimization circuit 41.

Digital summation circuit 35 receives the state variable amplitude value on bus 33, which may, for example, be the amplitude of resonant capacitor voltage $V_{CS1}$ and compares it to a reference value on bus 36. Digital summation circuit 35 generates a digital error signal on bus 37 which then is used by digital control circuit 38 to control voltage regulator 45. Specifically, the error signal generated on conductor 37 by summation circuit 35 causes control circuit 38 to generate control information on conductor 91 in order to effectuate the feedback needed by voltage regulator 45 to update the wireless power transfer system operating point values in accordance with any latest change that has occurred in the overall loading of the transmitter coil/inductor 59 (see FIG. 4A) that is located in transmitter coil and matching network 26. The particular implementation of detection and optimization circuitry 41 utilized is not critical, and can be implemented in various ways by those skilled in the art, for example by means of a look-up table (as subsequently explained) containing empirically determined data.

Thus, the voltage regulator output on conductor 47 is optimized based on the detected or extracted amplitude information and/or phase information. The output 47 of voltage regulator 45 causes inverter 48 to generate a suitable excitation current $I_S$, which in turn causes transmitter coil 59 and matching network 26 to adjust the amplitude A of resonant capacitor voltage $V_{CS1}$ on conductor 27. Control circuit 38, detection and optimization circuit 41, voltage regulator 45, and the output 49 of inverter 48 operate together so as to regulate the amplitude A of state variable $V_{CS1}$.

Figure 4B:
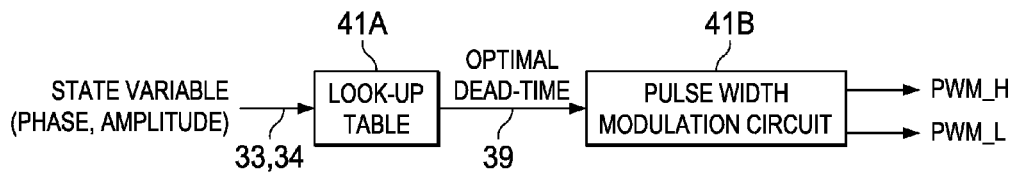
FIG. 4B is a block diagram of circuitry for generating the $V_{PWM\_H}$ and $V_{PWM\_L}$ signals for the inverter circuitry in FIG. 4A.

Inverter 48 thus receives an amplitude-based regulated input voltage generated by voltage regulator 45. Inverter 48 also receives, via signal path 39, PWM (pulse width modulation) signals $V_{PWM\_H}$ and $V_{PWM\_L}$ generated by detection and optimization circuit 41 based on phase and amplitude information extracted from the state variable waveform 1 (FIG. 1A) by means of information recovery circuit 32. PWM signals $V_{PWM\_H}$ and $V_{PWM\_L}$ are generated based on optimal dead-time information contained in an updated look-up table circuit 41A which is located in detection and optimization circuit 41 of FIG. 3A. The look-up table circuit 41A in detection and optimization circuit 41 is shown in FIG. 4B. FIG. 4B also includes a PWM circuit 41B having its input coupled to receive "optimal dead-time" information from look-up table 41A. PWM circuit 41B can be located in detection and optimization circuit 41 but alternatively it could be located in inverter 48. In any case, look-up table 41A and PWM circuit 41B cooperate to utilize the extracted amplitude information and phase information so as to generate the high and low PWM signals $V_{PWM\_H}$ and $V_{PWM\_L}$ which drive the switching transistors QH and QL, respectively, in inverter 48. The relatively short time during which transistors QH and QL both are in their OFF condition is referred to as the "dead-time".

Thus, voltage regulator 45 determines the input voltage on conductor 47 applied to the main input of inverter circuitry 48 in response to feedback received from control circuit 38 and detection and optimization circuit 41. If PWM circuit 41B is located in inverter 48, then the output 39 produced by detection and optimization circuit 44 includes the "optimal dead-time" information from look-up table 41A and is utilized by PWM circuit 41B to control the "dead-time" during which switching transistors QH and QL are simultaneously OFF. (If PWM circuit 41B is located in inverter 48, then path 39 conducts the $V_{PWM\_H}$ and $V_{PWM\_L}$ gate drive signals to the gates of transistors QH and QL, respectively, via buffer circuits 55 and 56.) Switching transistors QH and QL of inverter circuitry 48 are controlled in response to $V_{PWM\_H}$ and $V_{PWM\_L}$ so as to be never simultaneously in their ON conditions, in order prevent "shoot-through" currents. The relatively short time interval during which transistors QH and QL are in their OFF condition is referred to as the "dead-time". The dead-time should be a very small fraction of the time interval during which both switch transistors are in their ON conditions, i.e., a small fraction of the period of the fundamental frequency state variable. (It should be understood that there are various ways of determining the optimal dead-time at a particular point in time. The simplest way is to use a look-up table which contains the optimum dead-time values of a number of possible operating point values, respectively. Those dead-time values in the look-up table may be obtained empirically or mathematically.)

Figure 1B:
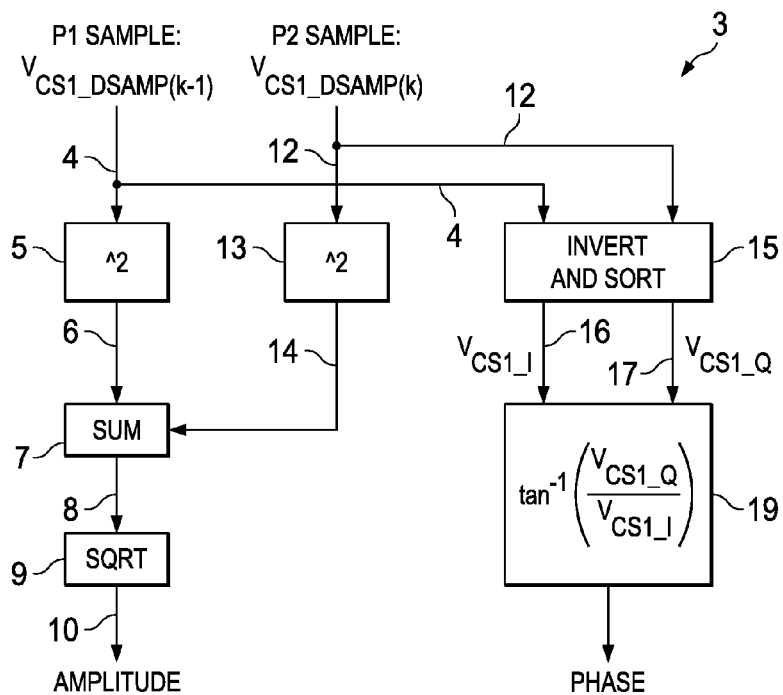
FIG. 1B is a block diagram of a conventional information recovery circuit for use in conjunction with the sub-sampling of FIG. 1A.
Figure 2:
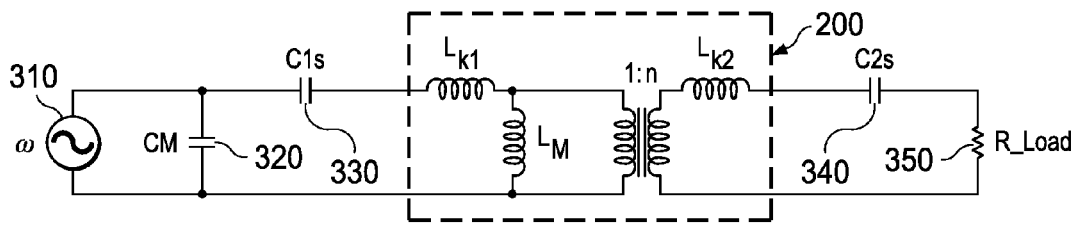
FIG. 2 is a block diagram of a prior art wireless power transfer system.

In the implementation shown in FIG. 3A, information recovery circuitry 32 includes the circuitry 3 shown in Prior Art FIG. 1 for digitally squaring the two low-frequency samples, digitally summing them, and then digitally computing the square root of the sum to obtain the state variable amplitude A. However, in another implementation, the two digitally squared sampled values are summed, and the square root of the sum is computed to obtain a representation of the amplitude A of the fundamental-frequency signal $V_{CS1}$. The phase θ of $V_{CS1}$ is obtained by computing the arctangent of the quadrature sample divided by the in-phase sample according to the expression θ=arctan($V_{CS1\_Q}$÷$V_{CS1\_I}$). The phase information is useful to precisely control the dead-time during which the transistor switches QH and QL of the inverter circuit are simultaneously OFF.

Figure 5A:
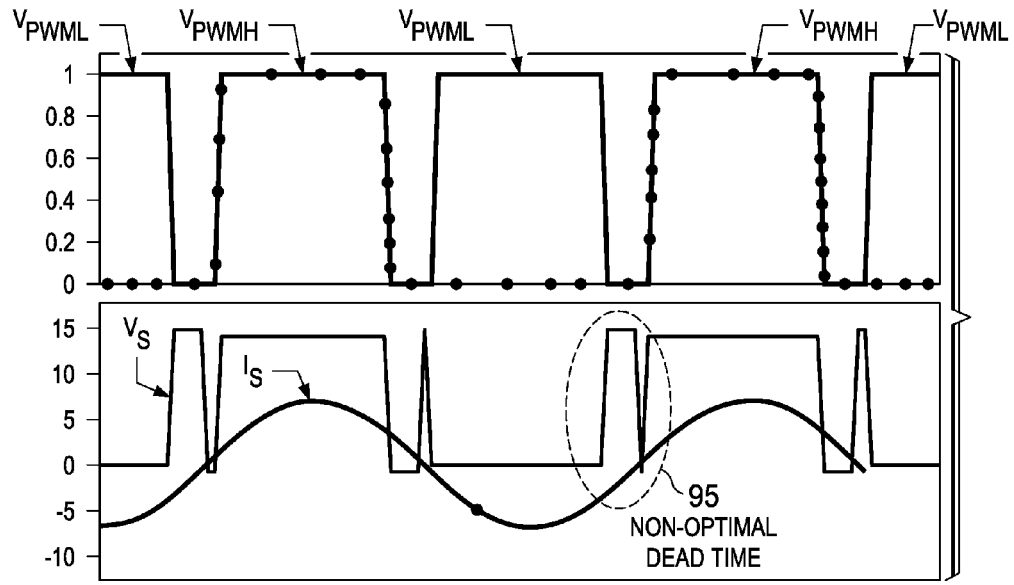
FIG. 5A shows waveforms of the gate electrode drive signals for the switch transistors in the inverter circuitry of FIG. 4 and an example of resulting non-optimal dead-time.
Figure 5B:
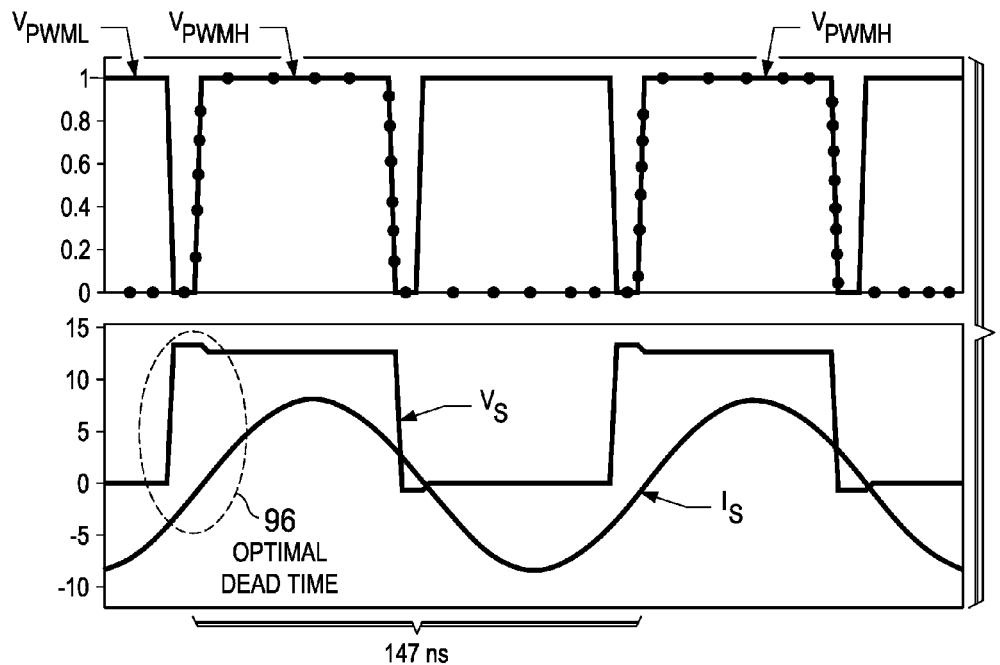
FIG. 5B shows waveforms of the gate electrode drive signals for the switch transistors in the inverter circuitry of FIG. 4 and an example of resulting optimal dead-time.

FIG. 5A shows waveforms of the gate electrode drive signals $V_{PWM\_H}$ and $V_{PWM\_L}$ for switch transistors QH and QL in inverter circuitry 48 of FIGS. 3A and 4. FIG. 5A also shows an example of the resulting "non-optimal dead-time" indicated by reference numeral 95. FIG. 5B shows waveforms of the gate electrode drive signals for the switch transistors QH and QL in inverter circuitry 48, and also shows an example of "optimal dead-time", indicated by reference numeral 96. Referring to FIGS. 5A and 5B, the waveforms $V_{PWM\_H}$ and $V_{PWM\_L}$ drive the buffer circuits 55 and 56, respectively, causing them to appropriately drive the gate electrodes of N-channel switch transistors QH and QL, respectively.

It is very important to optimize the dead-time in wireless power transfer systems transmitters as needed in response to changes in the loading on the transmitter coil, in order to efficiently and effectively accomplish zero-voltage switching (ZVS). Zero-voltage switching of transistors QH and QL is performed in order to minimize or eliminate power loss in transistors QH and QL. A minimum amount of the dead-time is required to accomplish such zero-voltage switching. The particular amount of dead-time actually needed is dependent on the operating point of the system and on the load to which power is being transferred. The zero-voltage switching is also required to prevent generation of a substantial amount of electromagnetic interference (EMI). A "non-optimal dead-time" condition for the signals $V_{PWM\_H}$ and $V_{PWM\_L}$ results in the voltage $V_S$ being distorted, and that distortion results in generation of harmonics of the fundamental frequency that are radiated as EMI. The "optimal dead-time" condition indicated by label 96 in waveform $V_{PWM\_H}$ in FIG. 5B results in a nearly ideal square wave for the voltage $V_S$, and results in substantially less generation of harmonic signals and associated EMI than is the case for the waveforms shown in FIG. 5A.

The use of a slower, lower cost ADC allows fabrication of a more cost effective wireless power transfer system. The signal architecture described with respect to FIG. 3A allows for simpler and more flexible design. Furthermore, the slower ADCs being used are less costly and are less power-hungry than fast ADCs used in the prior art. Generally, the described technique can be used to optimize dead-time, control magnetic field amplitude, detect and recognize a receiver, tune a transmitter resonant circuit, and enable certain in-band communication techniques. Phase and amplitude information can also be extracted using peak detection and zero-crossing circuits. (However, using peak detection and zero-crossing circuits has some disadvantages. For example, phase and amplitude information is affected by circuit non-linearities and variable signal propagation delays, it is not directly compatible with digital control circuits, and it may require more power.)

Figure 3B:
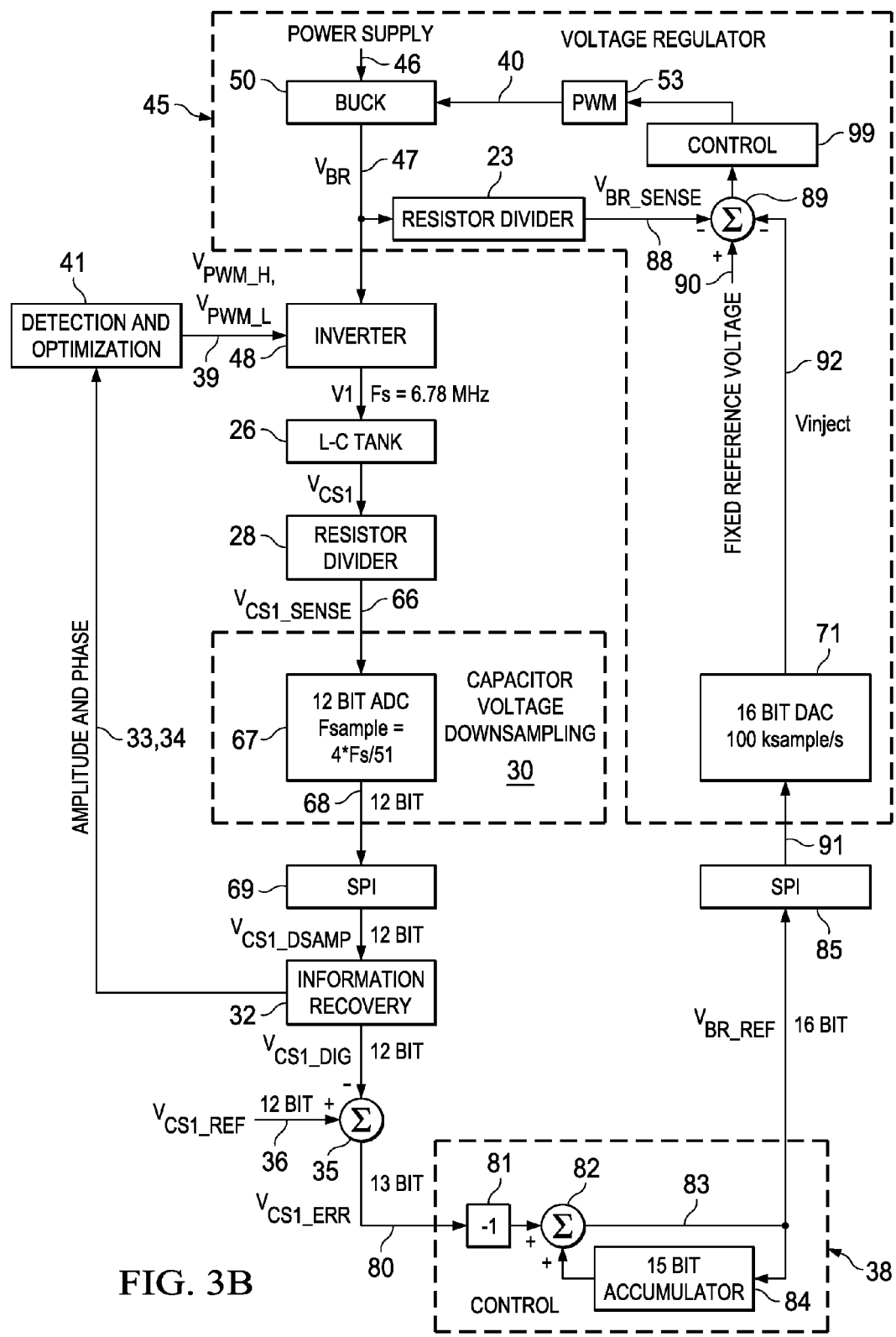
FIG. 3B is a more detailed diagram of the transmitter circuit of FIG. 3A.

FIG. 3B shows a more detailed implementation of FIG. 3A. Where suitable, the same or similar reference numerals are used in both drawings to indicate the same or similar parts. In FIG. 3B, voltage regulator 45 includes an ordinary buck converter 50 which receives a supply voltage on conductor 46 and a PWM signal on conductor 40. Buck converter 50 generates a regulated voltage $V_{BR}$ on conductor 47. Regulated voltage $V_{BR}$ is coupled to the input of resistor divider circuit 23 and also to an input of inverter circuit 48 (also see FIG. 4A). The output $V_{BR\_SENSE}$ of resistor divider circuit 23 is coupled to a (−) input of a summation/comparison circuit 89. Another (−) input of summation/comparison circuit 89 receives a signal $V_{INJECT}$ on conductor 92 from the output of a 16-bit DAC (to analog converter). A (+) input of digital summation/comparison circuit 89 is coupled to receive a fixed (or variable, depending on implementation) reference voltage on conductor 90. The output of summation/comparison circuit 89 is connected to the input of control circuit 99, which generates an input to a PWM circuit 53 (which could be PWM circuit 41B in FIG. 4B) having its output connected to conductor 40. In some embodiments, control circuit 99 is same as control circuit 38. Alternatively, control circuits 38 and 99 are different.

The output V1 produced by inverter circuit 48 is coupled to an LC tank circuit 65 (which contains the transmitter coil 59 in FIG. 4), the output of which is coupled to resistor divider circuit 28. The output $V_{CS1\_SENSE}$ of resistor divider circuit 28 is coupled by conductor 66 to the input of a relatively slow, low-cost 12-bit ADC 67. The output of ADC 67 is a 12-bit signal that is coupled to an input of a serial protocol interface (SPI) circuit 69.

ADC 67 performs the sub-sampling function of block 30 in FIG. 3A. The 12 bit output $V_{CS1\_DSAMP}$ of SPI circuit 69 is coupled to the input of information recovery circuit 32, which includes the circuitry 32 and function thereof shown in Prior Art FIG. 1B. The 12-bit output $V_{CS1\_DIG}$ of information recovery circuit 32 is coupled to the (−) input of digital summation circuit 35 having a 12-bit reference signal $V_{CS1\_REF}$ as its (+) input. Another output of information recovery circuit 32 produces state variable amplitude information on bus 33 as an input to detection and optimization circuit 41 (also see FIG. 3A), which generates "optimal dead-time" information on bus 39, which is provided as an input to L-C tank circuit 65. (Note that L-C tank circuit 65 is included in block 26 of FIG. 3A). A 13-bit output error signal $V_{CCS1\_ERR}$ is produced by digital summation circuit 35 and is coupled by bus 80 to the input of an inverter function 81 labeled "−1". Inverter function 81 is included in control circuit 38 (FIG. 3A), which also includes digital summation circuit 82 and a 15-bit accumulator 84. The output of digital inverter function 81 is coupled to a (+) input of digital summation circuit 82, the output of which is connected by digital bus 83 to provide the 16-bit reference signal $V_{BR\_REF}$ to the input of SPI circuit 85 and the input of 15-bit accumulator 84. The output of 15-bit accumulator 84 is connected to another (+) input of either digital summation circuit 82. The output of SPI circuit 85 is connected by bus 91 to the input of previously mentioned 16-bit DAC 71.

Voltage regulator 45, transmitter coil and matching network 26, and resistor divider circuit 28 in FIG. 3A ordinarily are analog circuits. However, sub-sampling circuit 30, information recovery circuitry 32, detection and optimizing circuit 41, summation circuit 35, and control circuit 38 may be either digital circuitry or analog circuitry. Inverter 48 is a typical switching circuit. Prior implementations of such information recovery circuitry have usually included digital implementations of the low frequency sub-sampling, amplitude detection processes, but analog implementations thereof may be practical in some cases.

Figure 6A:
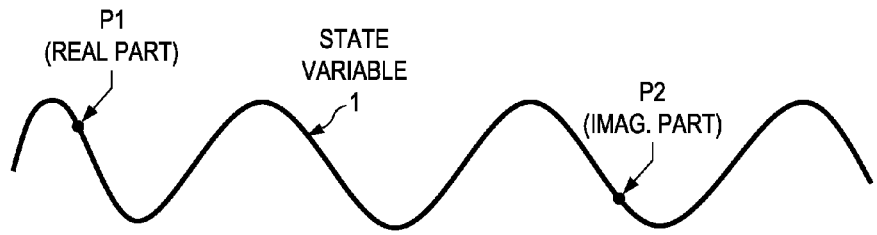
FIG. 6A is a waveform of the input signal in FIG. 6B.
Figure 6B:
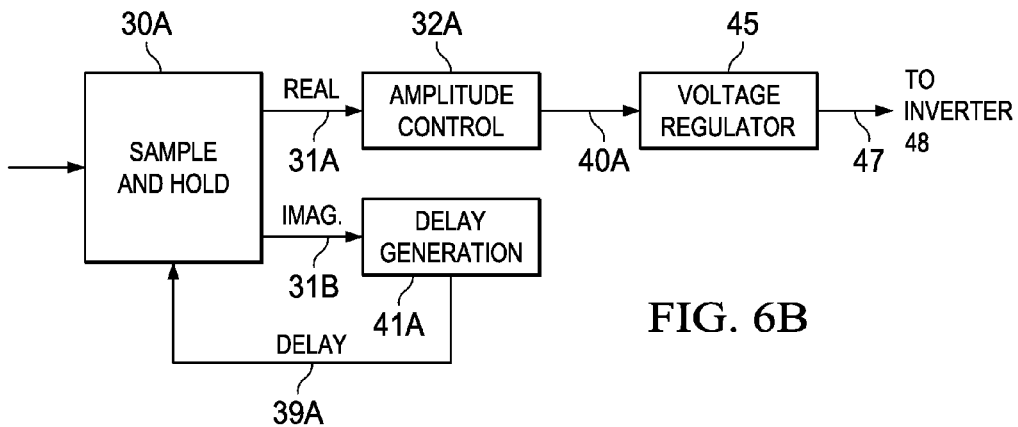
FIG. 6B is a block diagram of an analog implementation of sub-sampling which can be used to extract amplitude and phase information in the wireless power transfer system of FIG. 3A.

FIG. 6A shows a waveform of a state variable of the power transfer system 25 in FIG. 3A being applied to an input of an analog, rather than digital, implementation of the sub-sampling, information recovery, detection and optimization, and voltage regulator control functions of the mixed-signal implementation shown in FIG. 3A. FIG. 6B is a block diagram of an alternative analog implementation of the foregoing sub-sampling and information recovery circuitry which can be used instead of digital circuitry to extract amplitude and phase information in the wireless power transfer system of FIG. 3A. In FIG. 6B, the signal input of a sample and hold circuit 30A receives the state variable waveform 1 shown in FIG. 6A and generates a corresponding "real part" signal representation of the sampled state variable on conductor 31A and a corresponding "imaginary part" signal representation on conductor 31B. The real part signal generated on conductor 31A by sample and hold circuit 30A corresponds to the value of sampled point P1 on waveform 1 in FIG. 6A. The imaginary part signal generated on conductor 31B by sample and hold circuit 30A is provided as an input to delay generation circuit 41A, which produces a delay signal on conductor 39A and applies it to an input of sample and hold circuit 30A. The real signal representation of the sampled state variable is applied as an input to an analog amplitude control circuit 32A, the output 33A of which is applied to the control input conductor 40A of voltage regulator 45. Delay generation circuit 41A adjusts the sampling times such that the real part is equal to the peak value of the state variable and the imaginary part is equal to zero.

Thus, the above-described embodiment of the invention uses the described sub-sampling and associated amplitude and phase detection techniques for controlling a wireless power system by controlling power delivery or current delivery from the transmitter coil to a remote receiver coil, and also for controlling "dead-time" during switching of transistor switches QH and QL.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention. For example, although in one implementation an ADC is used to sample the fundamental-frequency signal to perform a conversion from the analog domain to the digital domain, in other cases the ADC conversion might not be necessary and instead an analog sampling technique might be utilized. Although a wireless embodiment of the invention is described, the output signal could also be transmitted via a conductive medium. In some cases, the described circuitry could be used in resonant converters or in general to resonant systems where a sinusoidal or quasi-sinusoidal signal needs to be sensed and/or controlled.

What is claimed is:

1. A resonant power transfer system comprising:
   (a) resonant circuitry including an inductor coil and a resonant capacitor, the resonant capacitor coupled to a first terminal of the inductor coil, wherein the inductor coil and the resonant capacitor resonate in response to an excitation signal to produce a state variable signal having a radio frequency;
   (b) sub-sampling circuitry for sampling a first point and a second point of the state variable signal at a rate which is substantially less than the radio frequency of the state variable signal;
   (c) information recovery circuitry for producing a state variable parameter signal representing a parameter of the state variable signal from information in the first and second sampled points;
   (d) control circuitry for producing a first control signal in response to the state variable parameter signal;
   (e) detection and optimization circuitry for producing a second control signal in response to the state variable parameter signal;
   (f) voltage regulation circuitry for producing a regulated supply voltage in response to the first control signal; and
   (g) switching inverter circuitry for producing the excitation signal in response to the regulated supply voltage and the second control signal.

2. The resonant power transfer system of claim 1, wherein the resonant circuitry is part of a transmitter circuit for wirelessly transmitting power to a receiving circuit, and wherein the state variable parameter signal represents an amplitude of the state variable signal, and wherein the information recovery circuitry produces a state variable phase signal representing a state variable phase, and wherein the detection and optimization circuitry produces the second control signal in response to both the state variable amplitude signal and the state variable phase signal.

3. The resonant power transfer system of claim 2, wherein the switching inverter circuitry includes first and second switches alternately coupling a second terminal of the inductor coil to the regulated supply voltage and a first reference voltage, and wherein the detection and optimization circuitry controls an amount of dead-time during which the first and second switches are turned off at the same time.

4. The resonant power transfer system of claim 1, wherein the state variable signal represents a voltage developed across the resonant capacitor.

5. The resonant power transfer system of claim 1, wherein the excitation signal represents a current in the inductor coil.

6. The resonant power transfer system of claim 1, wherein the information recovery circuitry produces an amplitude of the state variable signal by squaring and then summing values of the sampled first and second points, and then computing the square root of the squared and then summed values.

7. The resonant power transfer system of claim 2, wherein the information recovery circuitry produces the state variable phase signal by inverting and sorting values of the sampled first and second points to obtain a first value and a second value, and computing an arctangent of a quotient obtained by dividing the second value by the first value.

8. The resonant power transfer system of claim 2 further comprising:
circuitry for comparing the amplitude of the state variable signal to a first reference value to produce a first error signal as an input to the control circuitry.

9. The resonant power transfer system of claim 1, wherein the sub-sampling circuitry includes a relatively slow ADC (analog to digital converter) having an output coupled to a digital input of the information recovery circuitry, the information recovery circuitry having a digital output coupled to a first input of a digital summing and comparing circuit for comparing the digital output of the information recovery circuitry with a reference value to generate a first error signal as an input to the control circuitry, wherein the information recovery circuitry, detection and optimization circuitry, and control circuitry are digital circuits.

10. The resonant power transfer system of claim 1, wherein the sub-sampling circuitry, information recovery circuitry, detection and optimization circuitry, and control circuitry are analog circuits.

11. The resonant power transfer system of claim 3, wherein the detection and optimization circuitry controls the amount of dead-time so as to accomplish zero-voltage-switching (ZVS) of the first and second switches so as to reduce power consumption in the first and second switches and reduce electromagnetic interference (EMI).

12. The resonant power transfer system of claim 2 further comprising:
a receiver coil for receiving a signal transmitted by the transmitter circuit, and for providing a load to the transmitter circuit in a way that provides information about the receiver coil to the transmitter circuit by shifting the first and second sampled points.

13. The resonant power transfer system of claim 1, wherein the switching inverter circuitry includes a first transistor coupled between a second terminal of the inductor coil and the regulated supply voltage, and a second transistor coupled between the second terminal of the inductor coil and a reference voltage, the resonant capacitor being coupled between the regulated supply voltage and the first terminal of the inductor coil, the first transistor and second transistor being controlled in response to information contained in the state variable signal.

14. The resonant power transfer system of claim 13 further comprising:
an additional resonant capacitor coupled between the first terminal of the inductor coil and the reference voltage.

15. A method for operating a resonant power transfer system, the method comprising:
(a) operating an inductor coil and a resonant capacitor of a resonant circuitry to cause them to resonate in response to an excitation signal to produce a state variable signal having a radio frequency, the resonant capacitor coupled to a first terminal of the inductor coil;
(b) sampling a first point and a second point of the state variable signal at a rate which is substantially less than the radio frequency of the state variable signal;
(c) recovering information in the first and second sampled points to produce a state variable parameter signal representing a parameter of the state variable signal;
(d) producing a first control signal in response to the state variable parameter signal;
(e) producing a second control signal in response to the state variable parameter signal;
(f) producing a regulated supply voltage in response to the first control signal; and
(g) operating switching inverter circuitry to produce the excitation signal in response to the regulated supply voltage and the second control signal.

16. The method of claim 15, wherein the parameter of the state variable signal is an amplitude of the state variable signal, wherein recovering information in the first and second sampled points includes producing a state variable phase signal representing a state variable phase, and wherein the second control signal is produced in response to both the state variable amplitude signal and the state variable phase signal.

17. The method of claim 16, wherein the switching inverter circuitry includes first and second switches, the method including alternately coupling a second terminal of the inductor coil to the regulated supply voltage and a first reference voltage, and controlling an amount of dead-time during which the first and second switches are turned off at the same time.

18. The method of claim 15, wherein the inductor coil and the resonant capacitor are operated by a sub-sampling circuitry, the sub-sampling circuitry includes a relatively slow ADC (analog to digital converter) having an output coupled to a digital input of an information recovery circuitry recovering information in the first and second sampled points, the information recovery circuitry having a digital output coupled to a first input of a digital summing and comparing circuit, the method including comparing the digital output of the information recovery circuitry with a reference value to generate a first error signal as an input to a control circuitry producing the first control signal, wherein the information recovery circuitry, detection and optimization circuitry, and control circuitry are digital circuits.

19. The method of claim 17 further comprising:
controlling the amount of dead-time so as to accomplish zero-voltage-switching (ZVS) of the first and second switches so as to reduce power consumption in the first and second switches and reduce electromagnetic interference (EMI).

20. A resonant power transfer system, comprising:
(a) transmitter circuitry including an inductor coil and a resonant capacitor, the resonant capacitor coupled to a first terminal of the inductor coil, and means for operating the inductor coil and the resonant capacitor to cause them to resonate in response to an excitation signal to produce a state variable signal having a radio frequency;
(b) means for sampling a first point and a second point of the state variable signal at a rate which is substantially less than the radio frequency of the state variable signal;
(c) means for recovering information in the first and second sampled points to produce a state variable amplitude signal representing a parameter of the state variable signal;
(d) means for comparing an amplitude of the state variable amplitude signal to a first reference value to produce a first error signal in response to the state variable amplitude signal;

(e) means for producing a first control signal in response to the first error signal;
(f) means for producing a second control signal in response to the state variable amplitude signal;
(g) means for producing a regulated supply voltage in response to the first control signal; and
(h) means for operating switching inverter circuitry to produce the excitation signal in response to the regulated supply voltage and the second control signal.

* * * * *